J. BERGERON, Jr.
COMPUTING MEASURING VESSEL.
APPLICATION FILED JUNE 5, 1909.
952,867.
Patented Mar. 22, 1910.
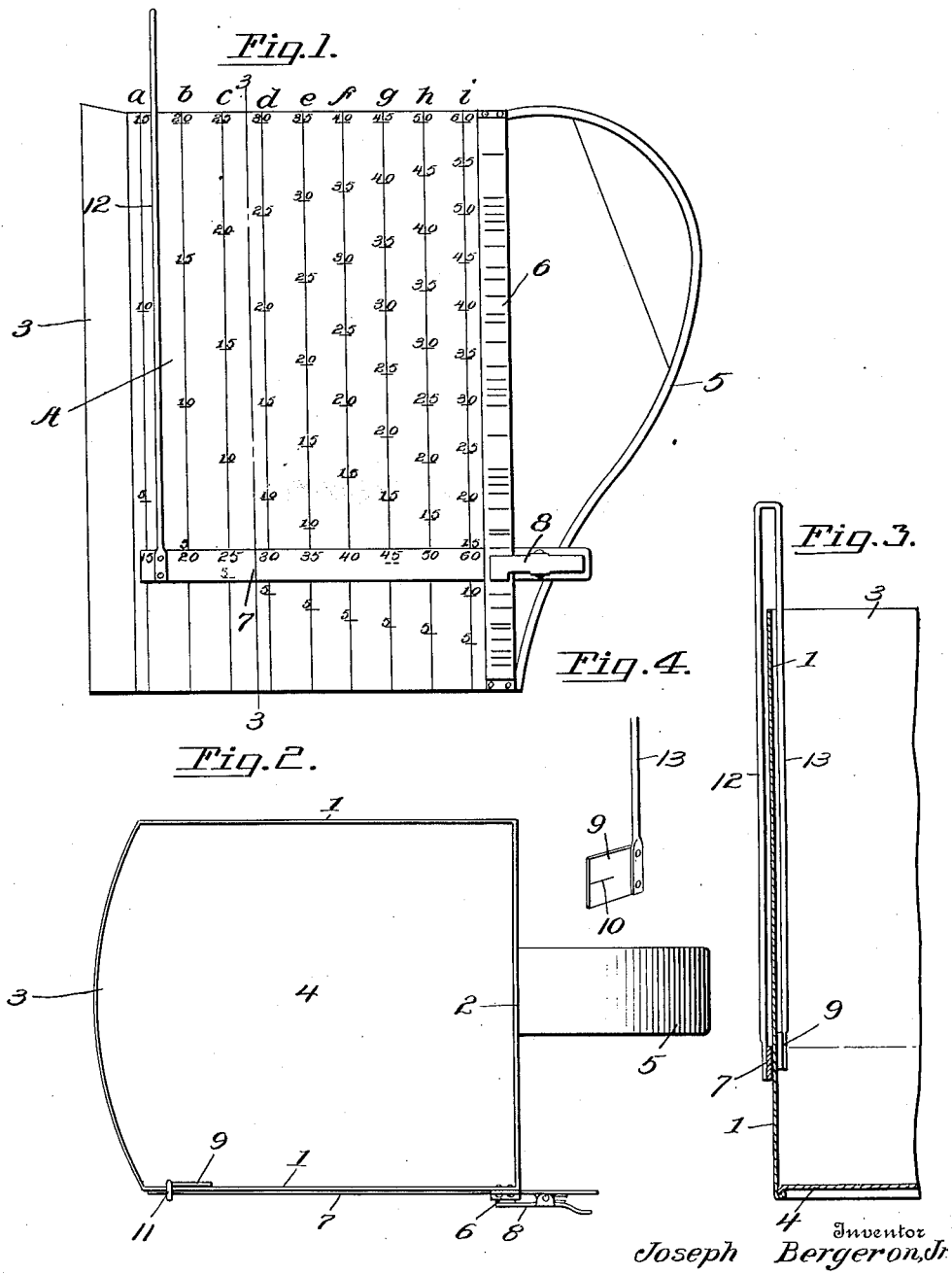
Witnesses
F. C. Gibson.
John F. Byrne.
Inventor
Joseph Bergeron, Jr.
By Victor J. Evans
Attorney

UNITED STATES PATENT OFFICE.

JOSEPH BERGERON, JR., OF EVANGELINE, LOUISIANA.

COMPUTING MEASURING VESSEL.

952,867.  Specification of Letters Patent.  Patented Mar. 22, 1910.

Application filed June 5, 1908. Serial No. 500,270.

*To all whom it may concern:*

Be it known that I, JOSEPH BERGERON, Jr., a citizen of the United States, residing at Evangeline, in the parish of Acadia and State of Louisiana, have invented new and useful Improvements in Computing Measuring Vessels, of which the following is a specification.

This invention relates to measuring vessels, and has for its object to provide a vessel of this character having simple and effective means for measuring a determined quantity of liquid and for computing and indicating the selling price of the same at so much per quart or gallon, according to the capacity of the vessel.

A further object of the invention is to provide a measuring vessel having measuring and computing means whereby the selling price of any desired fraction of the total amount of the substance the vessel is designed to hold may be determined, and whereby the selling price of any portion of such total quantity of substances selling at different prices may also be determined.

The invention consists of the features of construction, combination and arrangement of parts hereinafter fully described and claimed, reference being had to the accompanying drawing, in which:—

Figure 1 is a side elevation of a computing measuring vessel embodying my invention. Fig. 2 is a top plan view of the same. Fig. 3 is a vertical transverse section on line 3—3 of Fig. 1. Fig. 4 is a detail view of the measuring indicator.

The vessel A may be adapted for measuring either solids or liquids and may be made of any preferred form and material. In the present instance the vessel is shown as of rectangular form and comprises straight parallel side walls 1, a rear wall 2, a curved and inclined front wall 3 forming a discharge spout, and a bottom wall 4, the back wall 2 having secured thereto a suitable type of handle 5.

One of the side walls 1 is provided with vertical columns *a*, *b*, *c*, etc., formed by vertical parallel lines and respectively having arranged along said lines numerals indicating the selling prices of fractional amounts of the total quantity or amount of the substance the vessel is designed to hold, said lines and numerals being printed, stamped or otherwise formed upon said wall.

The numerals in the several columns are arranged to aline with the proper divisions or lines upon a vertical scale bar 6 secured at its upper and lower ends to the rear portion of the outer side of the said wall and spaced therefrom intermediate its ends, the measuring scale upon said bar indicating the total capacity of the vessel and fractional portions or divisions thereof.

The numerals in the several vertical columns indicate, respectively, the selling price of any fraction or portion of the total quantity the vessel is adapted to hold at different prices per quart or gallon.

Assuming that the vessel is of the proper size for use as a gallon measure, it will be understood that the scale upon the bar 6, which is equal in height to the vessel, indicates one full gallon and suitable fractional portions thereof, and that the numerals in the respective vertical column are computed to calculate the price of fractional portions of a gallon at different prices per gallon, so that the measure may be employed for dispensing different kinds of liquids or solids sold at different prices.

Arranged to slide vertically in contact with the scale wall 1 across the vertical columns of numerals is a movable gage strip or bar 7, the upper edge of which is adapted to be brought into indicating relation with the numerals of said rows and the lines or divisions on said strip 6. On the outer face of said strip or bar 7 are printed, stamped or otherwise formed numerals arranged to coöperate with the numerals of the respective vertical columns. These numerals indicate the prices per gallon of different substances. The rear end of the bar 7 projects through the space between the strip 6 and wall of the vessel, which forms a guideway therefor, and such end of the bar is provided with a spring actuated clamp 8 adapted to engage the face of the strip 6 and to clamp the bar at different positions of adjustment thereon.

A measuring indicator 9 is arranged within the vessel and bears against the inner face of the graduated wall thereof. This indicator comprises a rectangular plate having a suitable indicating mark 10 thereon. The plate 9 is connected with the bar 7 for movement in unison therewith by a connecting device or yoke 11 preferably formed of a looped piece of wire, the arms 12 and 13 of which are arranged vertically upon the interior and exterior of the vessel and are respectively connected at their lower ends with the forward end of the bar 7 and with the front portion of the indicator plate 9. When the parts 7 and 9 are at the limit of their downward movement, the connecting cross portion uniting the upper ends of the arms or rods 12 and 13 of the yoke or connecting member rests upon the upper edge of the graduated wall 1, as will be readily understood.

From the foregoing description, the construction of my improved measuring vessel will be readily understood, and the operation will be apparent without an extended description. If, for instance, a customer desires to purchase, say, a quart of molasses selling at the rate of 20¢ per gallon, the rear or handle end of the bar 7 is grasped and the thumb brought to bear upon the clamp 8 to release the same, then the bar 7 is moved upwardly until its upper edge registers with the quarter-gallon mark on the scale bar 6, when the clamp is released to hold the bar 7 in adjusted position. By reference then to the second vertical column b, which indicates the rates of fractions of a gallon at the amount named per gallon, it will be seen that the upper edge of the bar 7 registers with the numeral 5 in said column, thus indicating that the price of a quarter of a gallon of molasses at 20¢ per gallon is 5¢. This adjustment of the bar 7 at the same time brings the measuring indicator 9 to a position where its mark 10 indicates the level to which the vessel should be filled to measure out the identical amount of molasses desired, so that the operator at one and the same operation may compute the price of the fractional portion of a gallon of molasses and set the indicator 9 so that he may accurately measure out the calculated amount of molasses for dispensation. In a similar manner various quantities of liquids or solids may be measured out and the price of the same at different rates per gallon readily and conveniently determined without an arithmetical calculation.

Having thus fully described the invention what is claimed as new is:

1. A computing measuring vessel provided on the exterior thereof with means, including a movable indicator, for determining the price of a fractional amount of the total capacity of the vessel, a measuring indicator within the vessel, and means connecting said measuring indicator for movement with said computing indicator for determining the level to which the vessel should be filled to measure out the desired amount.

2. A computing measuring vessel provided upon the exterior thereof with a vertical column of numerals for indicating fractional amounts of the total capacity of the vessel at so much per quart or gallon, according to such capacity, a scale upon the exterior of the vessel for indicating the full capacity and fractions thereof, a gage strip movable to coöperate with said column of numerals and scale and provided with a numeral indicating the full price of the substance per quart or gallon, a measuring indicator within the vessel, and a connection between said measuring indicator and gage strip to adapt the same to move in unison.

3. A computing vessel provided upon the exterior thereof with a vertical column of figures indicating the prices of fractional portions of the capacity of the vessel, an exterior gage indicating such capacity and the levels of the fractional portions thereof, a coöperating gage strip provided with a numeral indicating the capacity price and vertically adjustable to register with the marks of the scale and figures of the column, means for securing said strip in adjusted position, a measuring indicator within the vessel, and a connection between said measuring indicator and gage strip to adapt the same to move in unison.

4. A computing vessel provided upon the exterior thereof with a vertical measuring scale and a series of columns of numerals arranged opposite the divisions of the scale to indicate the price of fractions of the total amount indicated by the scale, a measuring indicator movably mounted within the vessel, an indicator on the exterior of the vessel movable vertically along said scale and provided with total price numerals to respectively coöperate with the column numerals, and a yoke connecting said indicators for movement in unison.

In testimony whereof I affix my signature in presence of two witnesses.

JOSEPH BERGERON, Jr.

Witnesses:
 ERNEST FRUGIE,
 E. DARPHIN.